(12) United States Patent
Kitazawa et al.

(10) Patent No.: US 7,735,357 B2
(45) Date of Patent: Jun. 15, 2010

(54) SPM CANTILEVER AND MANUFACTURING METHOD THEREOF (75) Inventors: Masashi Kitazawa, Ina (JP); Ryo Ota, Minamiminowamura (JP); Masaki Tanemura, Owariasahi (JP)

(73) Assignee: Olympus Corporation, Tokyo (JP)

( * ) Notice: Subject to any disclaimer, the term of this patent is extended or adjusted under 35 U.S.C. 154(b) by 93 days.

(21) Appl. No.: 11/587,207

(22) PCT Filed: Apr. 20, 2005

(86) PCT No.: PCT/JP2005/007946

§ 371 (c)(1),
(2), (4) Date: Oct. 23, 2006

(87) PCT Pub. No.: WO2005/103648

PCT Pub. Date: Nov. 3, 2005

(65) Prior Publication Data

US 2008/0000293 A1 Jan. 3, 2008

(30) Foreign Application Priority Data

Apr. 26, 2004 (JP) .............................. 2004-129383

(51) Int. Cl.
*G01B 5/28* (2006.01)
(52) U.S. Cl. .................... 73/105; 850/58; 977/849; 977/860
(58) Field of Classification Search .................. 257/415
See application file for complete search history.

(56) References Cited

U.S. PATENT DOCUMENTS

| 5,171,992 A | 12/1992 | Clabes |
| 2002/0046953 A1* | 4/2002 | Lee et al. .................... 205/104 |
| 2002/0117659 A1* | 8/2002 | Lieber et al. .................. 257/14 |
| 2003/0001091 A1* | 1/2003 | Nakayama et al. .......... 250/306 |
| 2003/0172726 A1 | 9/2003 | Yasutake et al. |

FOREIGN PATENT DOCUMENTS

| DE | 19825404 A1 | 12/1999 |
| EP | 1278055 A1 | 1/2003 |
| EP | 1336835 A1 | 8/2003 |
| JP | 8-285872 A | 11/1996 |
| JP | 2000-249712 A | 9/2000 |

(Continued)

OTHER PUBLICATIONS

European Search Report dated Dec. 21, 2007, issued in corresponding European Patent Application No. 05734701.

(Continued)

*Primary Examiner*—Hezron Williams
*Assistant Examiner*—Mark Shabman
(74) *Attorney, Agent, or Firm*—Westerman, Hattori, Daniels & Adrian, LLP (57) ABSTRACT An SPM cantilever of the present invention including: a support portion (1) fabricated by processing a single crystal silicon wafer; a lever portion (2) formed in a manner extended from the support portion; a probe (3) disposed at a free end side of the lever portion; a coating of graphite film (5) covering all over the side on which the probe is formed and the entire probe; and a piece of thin line (6) consisting of a carbon nanofiber (CNF) or carbon nanotube (CNT) or graphite nanofiber (GNF) grown/formed from the graphite film at a probe terminal end portion (3a).

9 Claims, 8 Drawing Sheets

FOREIGN PATENT DOCUMENTS

| | | | |
|---|---|---|---|
| JP | 2003090788 A | 3/2003 |
| JP | 2003-240700 A | 8/2003 |
| JP | 2000249712 A | 9/2004 |

OTHER PUBLICATIONS

Kado, H. et al.; A novel ZnO whisker tip for atomic force microscopy; Ultramicroscopy vol. 42-44, pp. 1659-1663, Jul. 1992.

Lee, Kam L. et al.; Submicron Si trench profiling with an electron-beam fabricated atomic force microscope tip; Journal of Vacuum Science and Technology vol. B9, No. 6, pp. 3562-3568, Sep. 1991.

Keller, David J. et al.; Imaging steep, high structures by scanning force microscopy with electron beam deposited tips; Surface Science, vol. 268, pp. 333-339, May 2002.

* cited by examiner

SPM CANTILEVER AND MANUFACTURING METHOD THEREOF

TECHNICAL FIELD

The present invention relates to SPM cantilevers for use in a scanning probe microscope (SPM), and more particularly relates to SPM cantilever with an improved probe portion and manufacturing method thereof.

BACKGROUND OF THE INVENTION

The scanning probe microscopes (SPM) have a measuring resolution of atomic order and are used in various fields such as surface configuration measurements. A scanning probe microscope maintains a distance of the order of nanometer between its probe and a sample so that fine configurations be measured by detection of a physical quantity such as tunneling current or atomic force that occurs between the probe and the sample. Among others, an atomic force microscope (AFM) is suitable for high-resolution detection of the sample surface configuration and is used in measurements of surface configuration of semiconductors, optical disks, biological samples, etc.

The requirements for such scanning probe microscopes have recently been increased, however, for high-resolution measurements and for measuring those portions such as the interior of a trench that has not been reached by a probe heretofore. It is becoming difficult to meet such requirements by those scanning probe microscopes using a conventional Si-made cantilever that is available on market.

In recent years, on the other hand, researches are widely conducted on carbon nanotube (hereinafter referred to as CNT) which is currently formed for the most part using thermal decomposition and arc discharge. According to such methods of forming CNT, a tube having high aspect ratio can be formed as having a length of several μm to as long as several-ten μm in the axial direction as opposed to its diameter of several nanometer to several-ten nanometer. It is also known that such a carbon nanotube is almost completely graphitized and has bonding state equal to or exceeding that of a diamond which has a high level of hardness. It is exceptionally excellent in mechanical strength characteristics.

For this reason, attention is drawn to the use of CNT as a probe of SPM cantilever. For example, Japanese Patent No. 3441397 has proposed a method where CNT is previously grown/formed in a separate apparatus and a manipulator is used to adhere the CNT to a probe terminal end portion of SPM cantilever.

Figure 1:
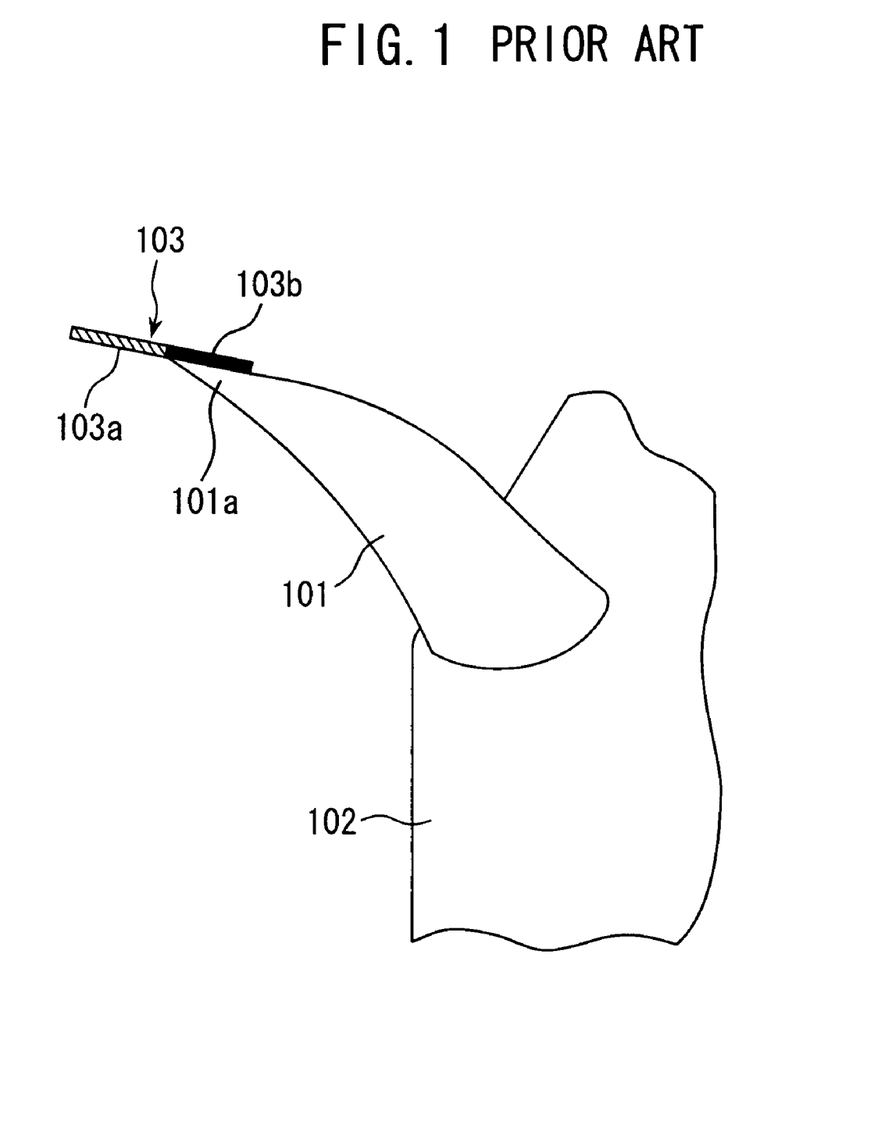
FIG. 1 is a perspective view showing a main portion of a prior-art SPM cantilever having CNT.

Shown in FIG. 1 is the construction of such previously proposed SPM cantilever having CNT. FIG. 1 includes: a probe 101; a cantilever portion 102; and CNT 103 attached to a probe terminal end portion 101a. Numeral 103a indicates an effective length of CNT 103 and 103b indicates a portion of CNT 103 along which it is adhered to the probe terminal end portion. The SPM cantilever having such construction where CNT 103 is formed as adhered to the probe terminal end portion 101a has a radius of curvature as small as nanometer order at its terminal end. The resolution obtained therefrom is high. It is also excellent in wear resistance and has an advantage that, even if the terminal end of CNT 103 is worn, the radius of curvature of the terminal end coming forth of CNT 103 is unchanged as is the lead of a pencil. Thereby a high resolution can be maintained even after it is used to scan a large number of sample surfaces.

Also, since CNT features an excellent flexibility, the tube itself is flexible so that data can be obtained without damaging a sample even when the sample is soft as a biological sample. Naturally, the feature that CNT is used in forming a probe having high aspect ratio can be applied so as to enable the probe to reach deeper into a trench whereby the configuration of the trench can be faithfully measured even when a deep trench configuration is scanned.

When a manipulator is used to attach CNT 103 to the probe terminal end portion 101a of the cantilever, the bonding strength thereof is weak and an excessive vibration or pressure might cause the adhering portion 103b to come off from the probe terminal end portion 101a. Further, a reduction in the aspect ratio of the probe occurs if a large amount of an adhesive or the like is applied to the bonding portion between the adhering portion 103b of CNT and the terminal end portion 101a of the probe 101 in order to increase the bonding strength thereof. Furthermore it is difficult to control the angle and/or direction at which CNT 103 is attached to the probe terminal end portion 101a and the forming of a probe with a reproducible CNT is also difficult because of the one-by-one work to be done. Moreover, a resistance occurs between CNT 103 and the probe 101 due to the fact that the two are bonded to each other by adhesion, where very small electrical characteristics cannot be measured.

In another method, CNT is formed through a catalyst metal by means of CVD method. In this case, although growth/formation of a large quantity of CNT is possible, the selective forming of a piece of CNT from the probe terminal end portion with controlling the direction of its growth is very difficult. Also, since the catalyst metal is formed all over the lever portion and/or support portion, a large number of CNT are caused to grow not only at the probe terminal end portion of SPM cantilever but also from the sides of the probe and/or the lever portion and/or the support portion. Especially the CNT occurring from the sides of the probe has an adverse effect for example on AFM measurements.

In view of the above problems, it is an object of the present invention to provide SPM cantilever having a probe capable of stable, high resolution measurements with providing high reliability and excellent durability. It is another object of the invention to provide a manufacturing method of SPM cantilever capable of highly reproducible manufacture with using simple methods. It is a further object of the invention to provide SPM cantilever and manufacturing methods thereof having an optimal probe structure or characteristic according to its use and also to provide optimal materials for use in such manufacturing method.

SUMMARY OF THE INVENTION

In a first aspect of the invention, there is provided an SPM cantilever including: a support portion; a lever portion extended from the support portion; and a projection-like probe formed in the vicinity of a free end of the lever portion, where a terminal end portion of the probe is provided with a piece of thin line.

Such construction makes it possible to achieve SPM cantilever capable of stable, high-resolution measurements with having high reliability and excellent durability.

In a second aspect of the invention, the thin line in the SPM cantilever according to the first aspect is one selected from a carbon nanofiber (CNF) or carbon nanotube (CNT) or graphite nanofiber (GNF).

In a third aspect of the invention, the thin line in the SPM cantilever according to the first aspect is a semiconductor nanowire (SNW) or semiconductor nanotube (SNT).

In a fourth aspect of the invention, the thin line in the SPM cantilever according to the first aspect is a metal nanowire (MNW) or metal nanotube (MNT).

With the construction of SPM cantilever according to the second to fourth aspects, the structure and/or characteristics of the thin line may be selectively used in agreement with its use. Also, since the resulting probe has a high aspect ratio, high-resolution measurements are possible. Especially in the case of CNF, CNT, or GNF, high-resolution measurements with excellent durability are made possible. In the case of SNW or SNT, a prior-art SPM cantilever made of silicon may be used without change in construction. The case of using MNW or MNT makes it possible to achieve SPM cantilever having electrical conductivity or ferromagnetism.

In a fifth aspect of the invention, there is provided a manufacturing method of the SPM cantilever according to the second aspect, including the steps of: forming at least a terminal end portion of the probe itself with a carbon compound or forming a carbon compound on a surface of at least the terminal end portion; and growing/forming the thin line by irradiating a high-energy beam onto the probe terminal end portion.

In a sixth aspect of the invention, there is provided a manufacturing method of the SPM cantilever according to the second aspect, including the step of growing/forming the thin line by irradiating a high-energy beam onto the probe terminal end portion while supplying a carbon compound to the vicinity of the probe terminal end portion.

In a seventh aspect of the invention, the carbon compound in the manufacturing method of SPM cantilever according to the fifth or sixth aspect is one selected from graphite (C), glassy carbon (g-C), silicon carbide (SiC), diamond-like carbon (DLC), amorphous carbon (a-C), titanium carbide (TiC), tungsten carbide (WC), chromium carbide (CrC) vanadium carbide (VC), or niobium carbide (NbC).

In an eighth aspect of the invention, there is provided a manufacturing method of the SPM cantilever according to the third aspect, including the steps of: forming at least a terminal end portion of the probe itself with a semiconductor or forming a semiconductor on a surface of at least the terminal end portion; and growing/forming the thin line by irradiating a high-energy beam onto the probe terminal end portion.

In a ninth aspect of the invention, there is provided a manufacturing method of the SPM cantilever according to the third aspect, including the step of growing/forming the thin line by irradiating a high-energy beam onto the probe terminal end portion while supplying a semiconductor to the vicinity of the probe terminal end portion.

In a tenth aspect of the invention, the semiconductor in the manufacturing method of SPM according to the eighth or ninth aspect is one selected from the semiconductors of simple substance of silicon (Si) or germanium (Ge) or one selected from the compound semiconductors of indium-phosphorus (InP), gallium-arsenic (GaAs), indium-antimony (InSb), aluminum-gallium-arsenic (AlGaAs), cadmium-tellurium (CdTe), or zinc oxide (ZnO).

In an eleventh aspect of the invention, there is provided a manufacturing method of the SPM cantilever according to the fourth aspect, including the steps of: forming at least the terminal end portion of the probe itself with a metal or metal compound or forming a metal or metal compound on a surface of at least the terminal end portion; and growing/forming the thin line by irradiating a high-energy beam onto the probe terminal end portion.

In a twelfth aspect of the invention, there is provided a manufacturing method of the SPM cantilever according to the fourth aspect, including the step of growing/forming the thin line by irradiating a high-energy beam onto the probe terminal end portion while supplying a metal or metal compound to the vicinity of the probe terminal end portion.

In a thirteenth aspect of the invention, the metal in the manufacturing method of SPM cantilever according to the eleventh or twelfth aspect is one selected from tungsten (W), titanium (Ti), molybdenum (Mo), copper (Cu), aluminum (Al), nickel (Ni), cobalt (Co), iron (Fe), chromium (Cr), gadolinium (Gd), or manganese (Mn), and the metal compound is one of the compounds of the above metals.

In a fourteenth aspect of the invention, the metal in the manufacturing method of SPM cantilever according to the eleventh or twelfth aspect is one selected from the noble metals of gold (Au), platinum (Pt), silver (Ag), or palladium (Pd), and the metal compound is one of the compounds of the noble metals.

In a fifteenth aspect of the invention, the high-energy beam in the manufacturing method of SPM cantilever according to any one of the fifth to fourteenth aspects is one selected from an ion beam, laser beam, electron beam, or high density plasma.

With the manufacturing methods of the above, a desired thin line of the types of carbon, semiconductor or metal may be selectively grown/formed with suitably using the structure and/or characteristics of the thin line in agreement with its use, where the desired thin line can be readily formed in a well controlled manner and with an excellent reproducibility. Of the high-energy beams, an ion beam or high density plasma makes a low-temperature synthesis possible, where the diameter of the thin line can be controlled by the types of ion. In the case of an electron beam, the thin line may be grown/formed only at a local area because the ion thereof can be narrowed. The case of using a laser beam is especially effective in forming the thin line of a high melting point metal.

DESCRIPTION OF THE PREFERRED EMBODIMENTS

Figure 2:
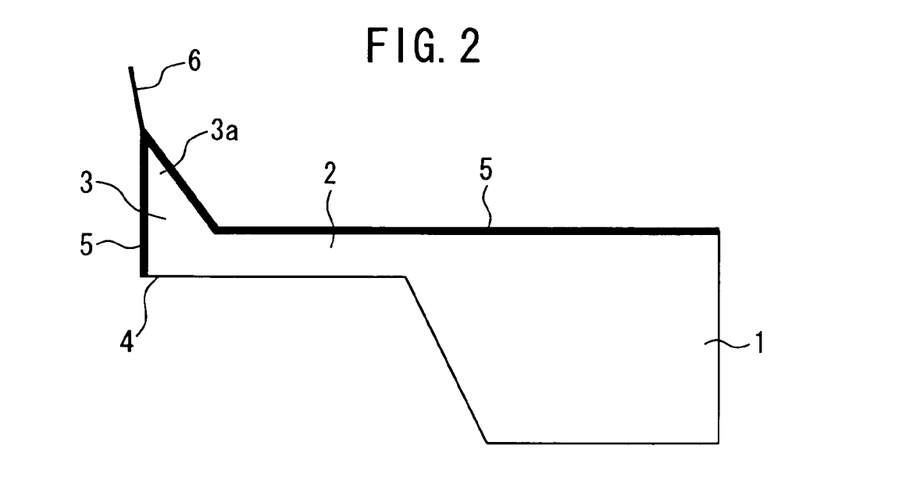
FIG. 2 is a sectional view showing construction of a first embodiment of SPM cantilever according to the present invention.

A description will be given below by way of the accompanying drawings to explain the present invention in more detail. A first embodiment of SPM cantilever according to the invention will now be described. FIG. 2 is a sectional view showing SPM cantilever according to the first embodiment of the invention. FIG. 2 includes: a support portion 1 fabricated by processing a single crystal silicon wafer; a lever portion 2 extended from the support portion 1; and a probe 3 disposed toward a free end 4 of the lever portion 2. Numeral 5 denotes a graphite film, i.e., a carbon compound provided as a coating so as to cover an entire side on which the probe is formed and the whole probe of the cantilever; and 6 denotes a piece of carbon nanofiber (CNF) thin line grown/formed on a probe terminal end portion 3a.

Figure 3A:
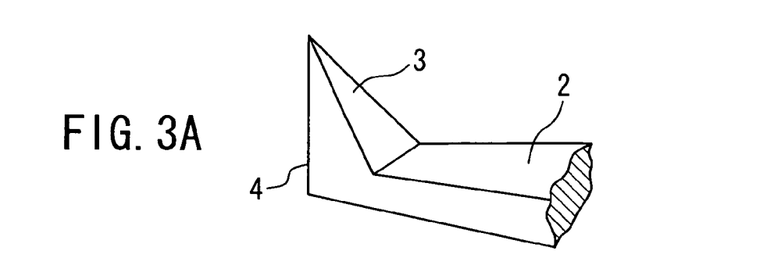
FIGS. 3A to 3C are manufacturing process drawings for explaining a manufacturing method of SPM cantilever according to the first embodiment shown in FIG. 2.
Figure 3B:
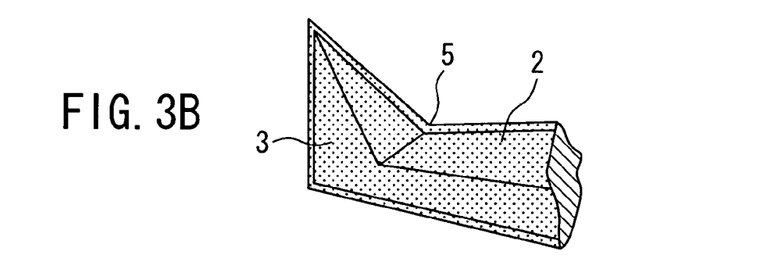
Figure 3C:
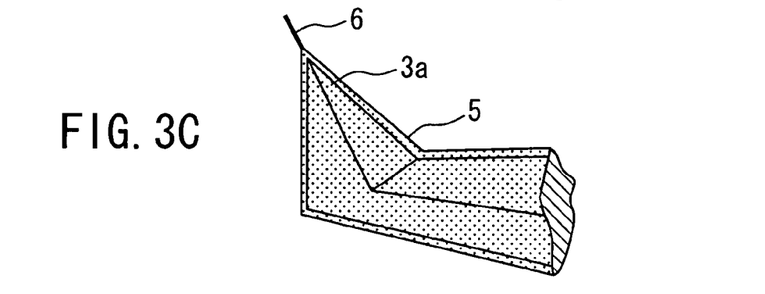

A manufacturing method of SPM cantilever having CNF thin line at its probe terminal end portion according to the present embodiment will now be briefly described by way of FIG. 3A to FIG. 3C. First, a cantilever formed of a silicon material as shown in FIG. 3A is prepared. The cantilever includes: the lever portion 2 extended from a support portion (not shown) fabricated by processing a single crystal silicon wafer; and the probe 3 disposed toward the free end 4 of the lever portion 2. The probe 3 is in a pyramidal form and preferably, for example, in the form of a tetrahedral, trigonal pyramid.

Next, as shown in FIG. 3B, a film for example of a carbon material such as graphite film 5 is formed by means of sputtering or electron beam vapor deposition on the front side on which the probe 3 of the cantilever is disposed and the side surfaces to a thickness of several nm to several μm. Of the graphite film 5, an equivalent effect is obtained in a wide range of film thickness. Next, as shown in FIG. 3C, a piece of CNF thin line 6 is selectively caused to grow on the probe terminal end portion 3a of the cantilever while controlling its direction in a vacuum apparatus.

Figure 4:
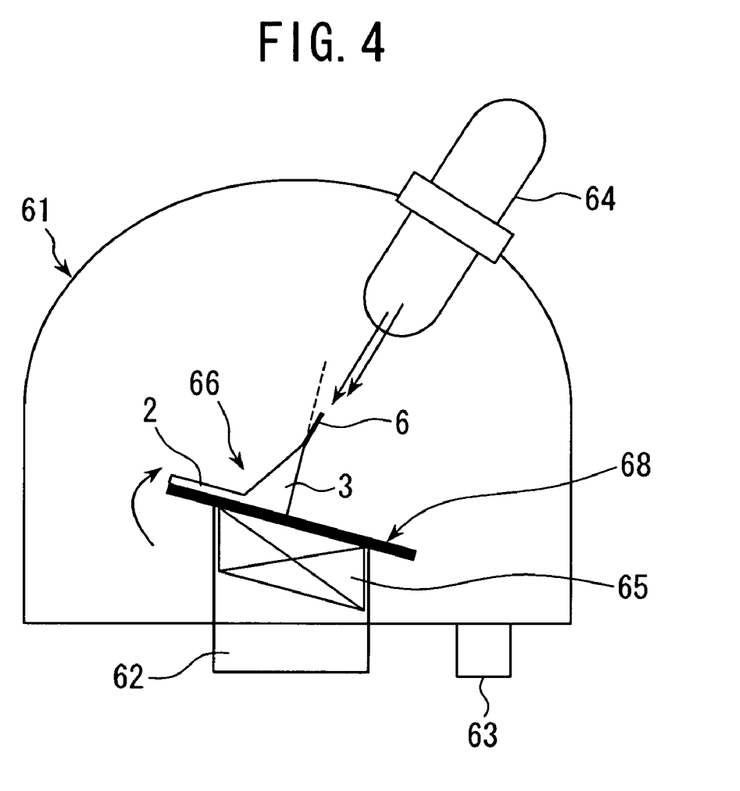
FIG. 4 shows the manner of growing/forming a CNF thin line with using a vacuum apparatus in the manufacturing process of SPM cantilever according to the first embodiment shown in FIGS. 3A to 3C.

Here, when CNF thin line 6 is grown, a vacuum apparatus 61 as shown in FIG. 4 is used, which includes: an air release outlet 63; an ion gun 64 with a beam diameter of several mm to several-ten cm for irradiating high-energy beam; and a sample stage 68 having a drive section 62 and a heater heating section 65 capable of heating a sample up to around 1000° C. At the interior of the vacuum apparatus 61, then, the cantilever 66 (support portion thereof not shown) is placed on stage 68 while the stage 68 is made movable so that the ion gun 64 be parallel to the direction along which the CNF thin line 6 is caused to grow.

At this time, the cantilever 66 is so placed that the forming of CNF thin line 6 is inclined by about 12° toward the free end of the lever portion 2 with respect to the probe 3 which is formed perpendicularly to the lever portion 2 of the cantilever 66. The reason for this is that, in using SPM cantilever as that set for example to SPM, a surface of the lever portion is generally set to have an inclination of about 12° so that the reflected light of laser beam from the lever portion surface be brought back to normal onto a photo detector. Scanning is thereby possible with always placing the terminal end of the CNF thin line 6 to a position nearest to the sample to be measured whereby high-resolution measurements become possible. According to its use, naturally, the above described inclination angle may be an angle other than 12° when the CNF thin line is grown while controlling the angle.

At the interior of the vacuum apparatus 61, a vacuum of the order of $10^{-2}$ Pa to $10^{-8}$ Pa and preferably of the order of $10^{-3}$ Pa to $10^{-5}$ Pa is set and argon ion, which is a rare gas ion, is used as the source of ionization. An acceleration voltage of 0.1 to 300 keV and an average ionic current density of 2 $\mu A/cm^2$ to 10 $mA/cm^2$ are employed to achieve an ion beam sputter rate of the order of 2 nm to 1 μm/min so as to grow/form CNF thin line having a length of the order of 0.1 to 10 μm and a thickness of the order of 1 to 10 nm from the probe terminal end portion by means of an ion irradiation of 1 to 100 minutes at room temperature. When the ion beam is irradiated onto the probe terminal end portion in this manner, chemical bond and transfer occur of the atoms at the probe terminal end portion, and as a result a piece of thin line consisting of CNF is selectively grown/formed at the probe terminal end portion.

While the growing of CNT thin line has been shown as that effected at room temperature, it can be grown also while heating it from room temperature to about 500-600° C. Cooling from room temperature to −150° C. is also possible. When the temperature at the time of the ion beam irradiation is to be changed in this manner, the film quality and growth rate of CNF thin line can be controlled. Further, by changing the ionic current density and acceleration voltage of the ion beam, the sputter rate can be readily changed. Further, while one using argon ion, which is a rare gas ion, as the source of ionization has been shown, helium ion, neon ion, or xenon ion can also be used, and it is also possible to use a reactive gas ion such as nitrogen ion, oxygen ion, or an ion containing CH radical as the source of ionization. The above forming condition of CNF thin line has been shown by way of an example only and naturally it is not limited to such.

With the SPM cantilever manufactured as the above having a piece of CNF thin line at the probe terminal end portion thereof, the angle and/or direction of the tip of CNF thin line to be formed at the probe terminal end portion can be controlled, and a probe having high aspect ratio is obtained. It is thereby possible in attaching the SPM cantilever to SPM apparatus to bring the thin line at the probe terminal end portion to a position where it is always vertical to a horizontal surface of the sample so that an improved resolution at the time of SPM measurements is expected. Further, since CNF thin line consisting of one piece only can be formed in a well controlled manner at the probe terminal end portion through batch fabrication, a reduction in cost results. Furthermore the thin line is grown/formed from the same element so that an excellent durability is obtained without an adhesive. Moreover, since CNF is grown as having almost the same thickness all along, a thin line having high aspect ratio can be achieved. As a result, well reproducible and stable high-resolution measurements are possible even with a sample having rough surface irregularities. Accordingly, a highly reliable SPM cantilever is achieved.

The shape of the probe of SPM cantilever includes but not limited to a tetrahedral form as that has been shown in the present embodiment. Naturally similar advantages are obtained also from pyramidal or polygonal pyramidal probes or conical projecting probes.

One using a graphite film formed by sputtering or electron beam vapor deposition has been shown as the carbon compound film to be formed on the front side and side surfaces toward the probe of the cantilever. It is however not limited to such and similar advantages can be obtained from those films that contain carbon element such as silicon carbide (SiC), glassy carbon (g-C), diamond-like carbon (DLC), amorphous carbon (a-C), titanium carbide (TiC), tungsten carbide (WC), chromium carbide (CrC), vanadium carbide (VC), or niobium carbide (NbC). Furthermore, in forming the film of carbon compound, methods other than sputtering or electron beam vapor deposition may also be used. It can also be formed such as by CVD or other vapor deposition methods. On the other hand, if the cantilever itself consisting of a lever portion and probe is fabricated from a carbon compound, it is naturally easy to form a carbon-type CNF thin line at the probe terminal end portion.

Figure 5:
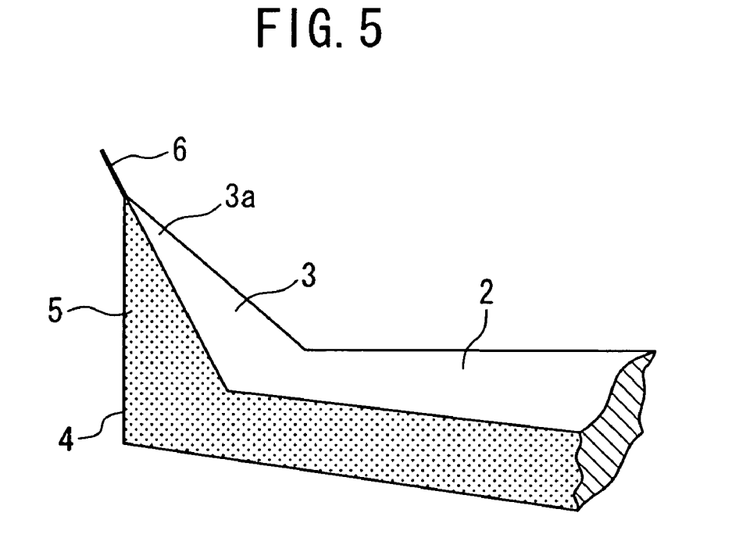
FIG. 5 shows a modification of the manufacturing method of SPM cantilever according to the first embodiment shown in FIGS. 3A to 3C.

The forming of a carbon compound film has been shown as but not limited to one where it is formed over the entire surface of the side on which the probe is formed. It is also possible as shown in FIG. 5 to form a carbon compound 5 only from the side surfaces toward the terminal end of the probe 3 by effecting deposition from the back side of the free end 4 of the lever portion 2. In this case, a carbon compound is not applied to the front side of the lever portion 2 on which the probe 3 is formed whereby a growth of CNF thin line 6 is not caused at unwanted portions other than the probe terminal end portion 3a.

The thin line to be formed at the probe terminal end portion 3a has been shown as but not limited to one using CNF thin line 6. It is possible to grow CNT or GNF by controlling growth rate and/or atmosphere, and naturally similar advantages are obtained therefrom. Here, CNF, CNT, or GNF may be selectively used according to use. For example, when high resolution is required, an extremely fine thin line of CNT having a diameter of several nanometer is formed. For a probe having excellent durability but with less requirement for high resolution, on the other hand, the requirements can be met by forming it with CNF or GNF.

Figure 6:
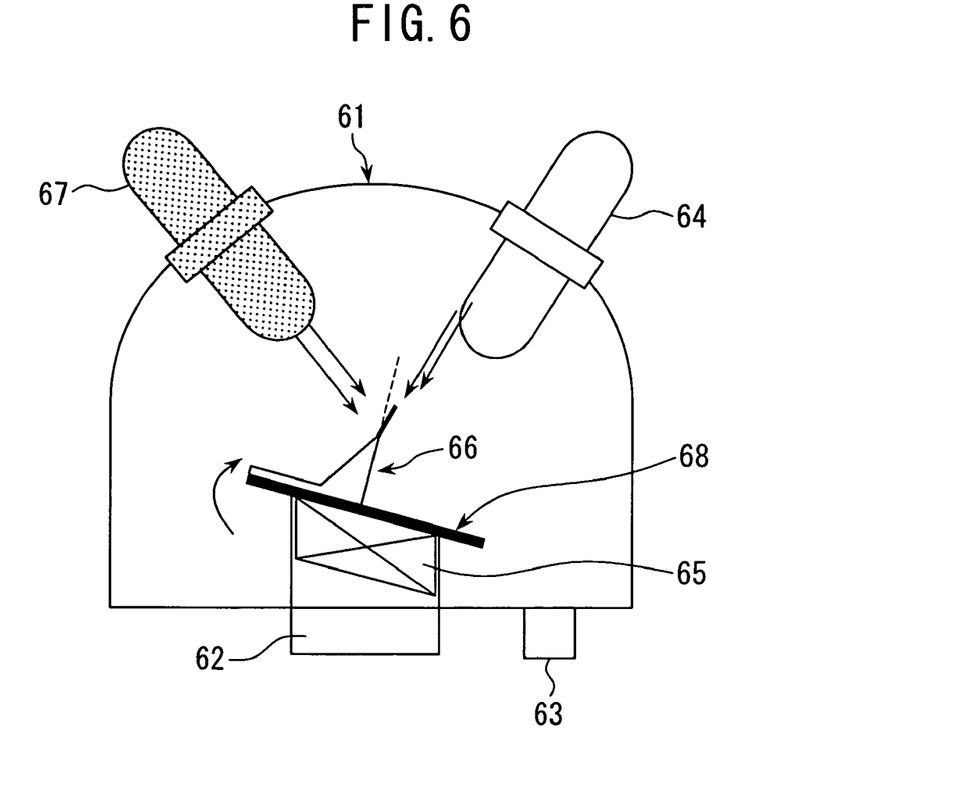
FIG. 6 shows the manner of growing/forming a CNF thin line in a vacuum apparatus to be used in another manufacturing method of SPM cantilever according to the first embodiment shown in FIG. 2.

In the one shown above, a carbon compound is previously formed at the probe terminal end portion and CNF thin line is grown/formed by effecting a high-energy beam irradiation. It is however also possible to form CNF without forming a carbon compound at the probe terminal end portion, by irradiating a high-energy beam at the same time of supplying a carbon compound onto the vicinity of the probe terminal end portion. In this case, an ion irradiation source 67 as shown in FIG. 6 becomes necessary, for introducing a carbon gas into the vacuum apparatus 61 so as to ionize and irradiate the gas.

Further, it is also possible that the irradiation of a high-energy beam onto the probe terminal end portion be effected while supplying onto the probe terminal end portion such elements (metal particles) as Mo, Ta, W, or Ti. In this case, it becomes possible to control the growth, specifically the thickness, grow rate and diameter of CNF, CNT, or GNF. In the case of supplying the above metal particles into the vacuum apparatus 61, however, a metal particle supply source such as a sputter, arc plasma, laser ablation, electron beam vapor deposition is separately required.

The above described embodiment has been shown as that in which an ion beam is used as the high-energy beam to grow/form CNF thin line. Naturally, however, such high-energy beams as laser beam, electron beam or high density plasma may also be used besides the ion beam.

In the above embodiment, the growth/formation has been described of CNF thin line of a carbon compound as the thin line to be formed at the probe terminal end portion. It is not limited to such and a semiconductor nanowire (SNW) or semiconductor nanotube (SNT) of a simple substance semiconductor such as silicon (Si) or germanium (Ge) or of a compound semiconductor such as gallium-arsenic (GaAs), indium-phosphorus (InP), indium-antimony (InSb), aluminum-gallium-arsenic (AlGaAs), cadmium-tellurium (CdTe), or zinc oxide (ZnO) can be formed as the thin line at the probe terminal end portion with using similar high-energy beam irradiation methods. Moreover, it is naturally possible that similar high-energy beam irradiation methods be used to form at the probe terminal end portion a metal nanowire (MNW) or metal nanotube (MNT) as a thin line of a metal such as tungsten (W), titanium (Ti), molybdenum (Mo), copper (Cu), aluminum (Al), nickel (Ni), cobalt (Co), iron (Fe), chromium (Cr), gadolinium (Gd), or manganese (Mn), or of a noble metal such as gold (Au), platinum (Pt), silver (Ag), or palladium (Pd), or of a compound of these.

Here, in the case of SNW and SNT made of silicon, a thin line can be formed with using a prior-art silicon-made cantilever without change. Further, when a thin line of SNW or SNT is to be formed at the probe terminal end portion, it is possible to form the probe terminal end portion itself from a semiconductor or to previously form a semiconductor film at the probe terminal end portion so as to form the SNW or SNT thin line by an irradiation of high-energy beam. Furthermore, a thin line of SNW or SNT can be grown/formed by irradiating a high-energy beam while supplying a semiconductor material to the vicinity of the probe terminal end portion.

In the case of MNW or MNT, on the other hand, SPM cantilever having electrical conductivity or ferromagnetism can be achieved. Also in the case where MNW or MNT thin line is formed at the probe terminal end portion, it is possible to form the probe terminal end portion itself with a metal or metal compound or form a film of a metal or metal compound on the probe terminal end portion, and then to form MNW or MNT thin line by means of a high-energy beam irradiation. Moreover, MNW or MNT thin line can be grown/formed by irradiating a high-energy beam while supplying a metal or metal compound to the vicinity of the probe terminal end portion.

Figure 7:
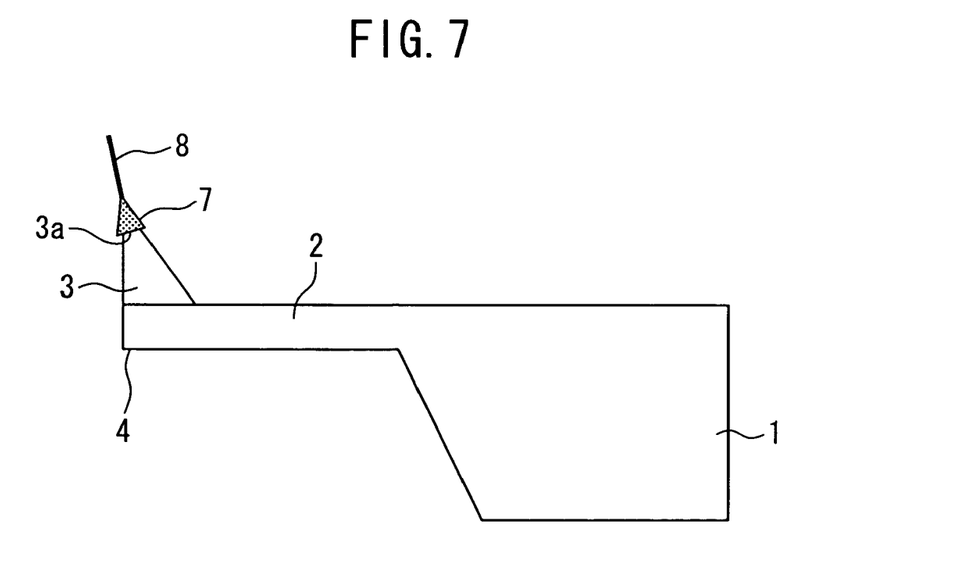
FIG. 7 is a side view showing construction of SPM cantilever according to a second embodiment of the invention.

A second embodiment of the invention will now be described. FIG. 7 is a side view showing construction of SPM cantilever according to the present embodiment. FIG. 7 includes: a support portion 1 fabricated by processing a single crystal silicon wafer; a lever portion 2 extended from the support portion 1; and a probe 3 disposed toward a free end 4 of the lever portion 2. What is denoted by numeral 7 is a graphite film which is a carbon compound, formed only at a probe terminal end portion 3a, and 8 is a piece of carbon nanofiber (CNF) thin line formed at the probe terminal end portion 3a, grown/formed from the graphite film 7.

Figure 8A:
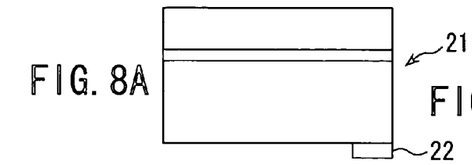
FIGS. 8A to 8J are manufacturing process drawings for explaining a manufacturing method of SPM cantilever according to the second embodiment shown in FIG. 7.

A manufacturing method of SPM cantilever having CNF thin line at the probe terminal end portion according to the present embodiment will now be briefly described by way of FIG. 8A to FIG. 8J. First, as shown in FIG. 8A, an SOI (Silicon-On-Insulator) silicon substrate 21 having lattice plane (100) is prepared, and a mask pattern 22 for forming the support portion of the cantilever is formed of a thermal-oxidation silicon film on the SOI silicon substrate 21 by means of photolithography.

Figure 8B:
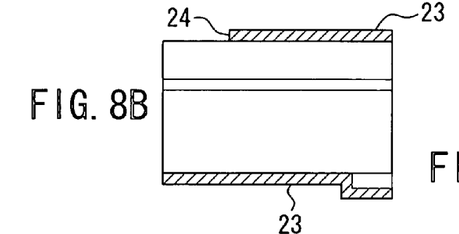

Next, as shown in FIG. 8B, a silicon nitride film 23 is formed for example to a thickness of the order of 100 nm on the front and back sides of the SOI silicon substrate 21. A mask pattern 24 for forming two faces of a tetrahedral probe is then formed using the silicon nitride film 23 by means of photolithography.

Figure 8C:
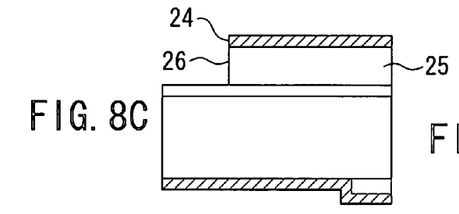
Figure 8D:
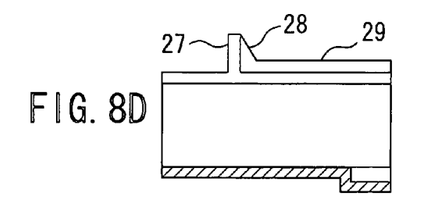

Next, as shown in FIG. 8C, the SOI silicon substrate is vertically processed on the side of an active layer 25 using Deep-RIE (Deep Reactive-Ion-etching) by the mask pattern 24 to form a vertical surface 26 of silicon. Next, as shown in FIG. 8D, after forming a thermal-oxidation film 27 on the vertical surface 26 to a thickness of the order of 1 µm, the mask pattern 24 is removed to expose the active layer 25, i.e., silicon (100) plane under the mask pattern on the front side. Subsequently, the silicon active layer 25 is etched away by dipping it into an alkaline solution such as KOH (potassium hydroxide) solution to fabricate a projection 28 in a tetrahedral form as shown in the figure. Here, the difference in etching rate by lattice plane directions is used to fabricate the tetrahedral projection 28. Further, the etching of the silicon active layer 25 is effected until a thickness 29 of the lever portion suitable for a predetermined characteristic is achieved. The probe (projection) 28 is thereby fabricated as formed of two substantially vertically raised planes and Si lattice plane (111).

Figure 8E:
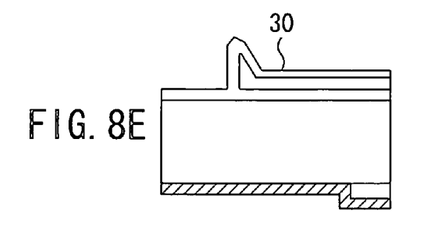

Next, as shown in FIG. 8E, the thermal-oxidation film 27 formed on the vertical plane 26 is removed by means of a fluoric acid solution, and, subsequently, an oxide film 30 is formed to about 200 nm all over the front side for example by means of an atmospheric pressure CVD.

Figure 8F:
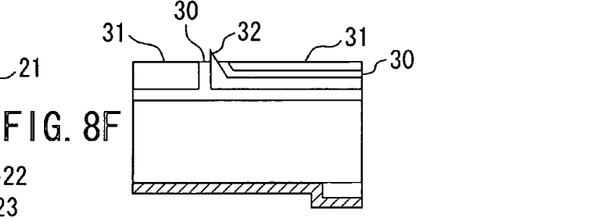

Next, as shown in FIG. 8F, the front side is coated with a resist film 31, where the resist film 31 is formed so that the oxide film 30 only of the probe terminal end portion 32 appears on the front side. Subsequently, it is dipped into a fluoric acid solution to remove the oxide film 30 only of the probe terminal end portion 32.

Figure 8G:
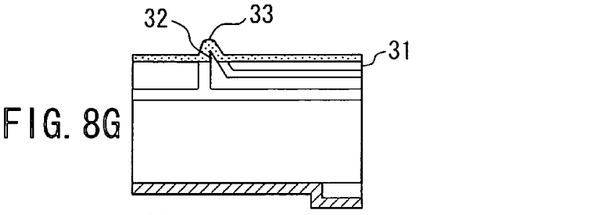

Next, as shown in FIG. 8G, a graphite film 33 is formed to a thickness of the order of several nm to several μm all over the front side by means of sputtering or electron beam vapor deposition. Equivalent effects are obtained in such a wide range of film thickness of the graphite film 33. Since the resist film 31 is previously formed, the graphite film 33 is formed at a low temperature of the order of room temperature to 100° C. The probe terminal end portion 32 is thereby covered with the graphite film 33.

Figure 8H:
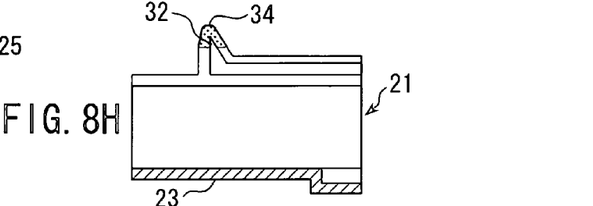

Next, as shown in FIG. 8H, the resist film 31 formed on the front side is lifted off by dipping it into an alcoholic solution and subjecting it to ultrasonic cleaning. While a graphite film 34 is caused to remain only at the probe terminal end portion 32, the graphite film 33 of the other portions is thereby removed along with the resist film 31.

Figure 8I:
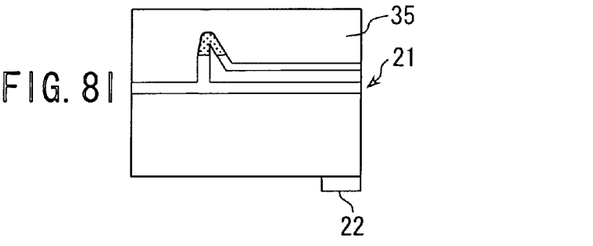

Next, as shown in FIG. 8I, after removing the previously formed silicon nitride film 23 on the back side of SOI silicon substrate 21 for example by means of hot phosphoric acid, a resist film 35 is formed all over the front side to such a thickness that the probe, lever portion, etc. are completely protected.

Figure 8J:
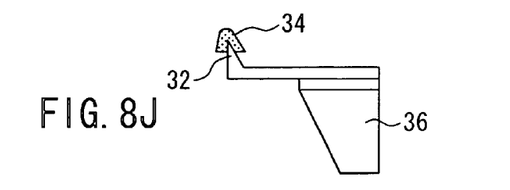

Next, as shown in FIG. 8J, SOI silicon substrate 21 is processed from the back side using an alkaline solution such as KOH so that the shape of the support portion 36 results, and then the resist film 35 serving as the surface protection film and the mask pattern 22 of an oxide film, etc. are removed. A structure is thereby complete as having construction where the graphite film 34 is formed only at the probe terminal end portion 32 of the silicon-made cantilever.

Finally, similarly to the manufacturing method of the first embodiment, the interior of a vacuum apparatus is set to a vacuum of the order of $10^{-2}$ Pa to $10^{-8}$ Pa and preferably of the order of $10^{-3}$ Pa to $10^{-5}$ Pa, and argon ion, which is a rare gas ion, is used as the source of ionization. An acceleration voltage of 0.1 to 300 keV and an average ionic current density of 2 $\mu A/cm^2$ to 10 $mA/cm^2$ are employed to achieve an ion beam sputter rate of the order of 2 nm to 1 μm/min so as to grow/form CNF thin line having a length of the order of 0.1 to 10 μm and a thickness of the order of 1 to 10 nm from the probe terminal end portion by means of an ion irradiation of 1 to 100 minutes at room temperature. When the ion beam is irradiated onto the probe terminal end portion in this manner, chemical bond and transfer occur of the atoms at the probe terminal end portion, and as a result a piece of thin line consisting of CNF is selectively grown/formed at the probe terminal end portion.

While the growing of CNT thin line has been shown as that effected at room temperature, it can be grown also while heating it from room temperature to about 500-600° C. Cooling from room temperature to −150° C. is also possible. When the temperature at the time of the ion beam irradiation is changed in this manner, the film quality and growth rate of CNF thin line can be controlled. Further, by changing the ionic current density and acceleration voltage of the ion beam, the sputter rate can be readily changed. Further, while one using argon ion, which is a rare gas ion, as the source of ionization has been shown, helium ion, neon ion, or xenon ion may also be used, and it is also possible to use a reactive gas ion such as nitrogen ion, oxygen ion, or an ion containing CH radical as the source of ionization. The forming condition of CNF thin line has been shown by way of an example only and is not limited to what described above. By the above manufacturing process, SPM cantilever having a piece of CNF thin line 8 formed on the probe terminal end portion 3a as shown in FIG. 7 is complete.

With the SPM cantilever of such construction, since the terminal end of the CNF thin line of the probe terminal end portion can be always kept vertically to a horizontal surface of the sample when it is attached to SPM apparatus and also since a probe having high aspect ratio is achieved, an improved resolution at the time of SPM measurements is expected. Further, since CNF thin line consisting of one piece only can be formed in a well controlled and reproducible manner at the probe terminal end portion through batch fabrication, a reduction in cost results. Furthermore, since a carbon material is formed only at the probe terminal end portion and the cantilever is formed only of silicon which has conventionally been used, mechanical characteristics thereof are stable. Moreover, since CNF is grown as having almost the same thickness all along, a thin line having high aspect ratio can be achieved. As a result, well reproducible and stable high-resolution measurements are possible even with a sample having rough surface irregularities. Accordingly, a highly reliable SPM cantilever is achieved.

Figure 9A:
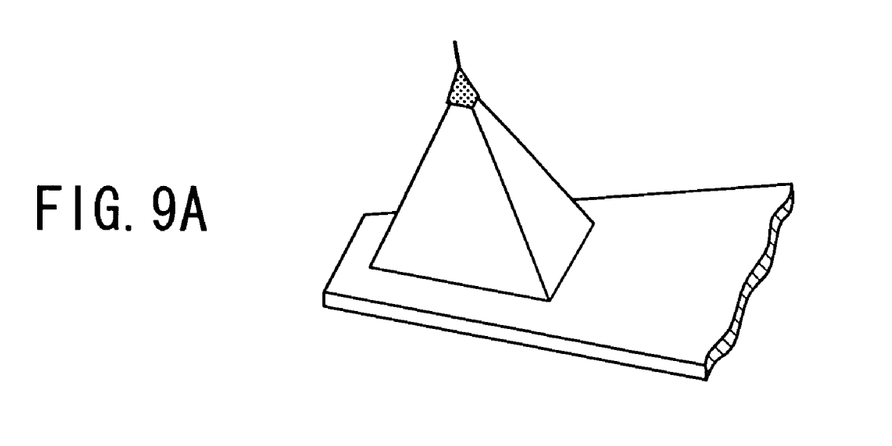
FIGS. 9A to 9C are perspective views showing a modification of SPM cantilever according to the second embodiment shown in FIG. 7.
Figure 9B:
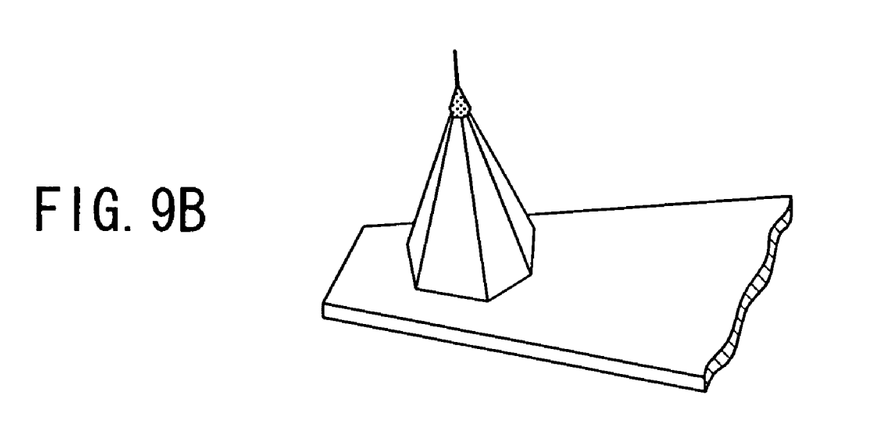
Figure 9C:
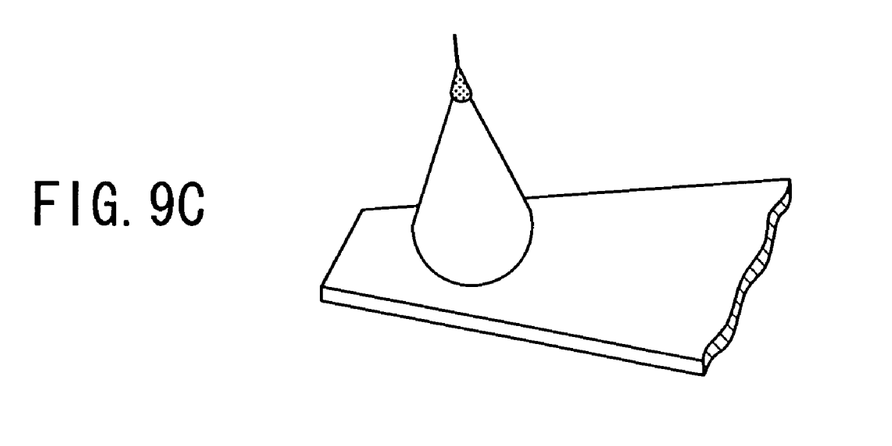

The shape of cantilever probe includes but not limited to a tetrahedral form as that has been shown in the present embodiment. Naturally similar advantages are obtained also from a pyramidal or polygonal pyramidal probe or a conical probe which are respectively shown in FIG. 9A, FIG. 9B or FIG. 9C.

The coating film of a carbon compound on the probe terminal end portion includes but not limited to the one in the present embodiment where a graphite film by sputtering or electron beam vapor deposition is used. Naturally similar advantages are obtained from those films containing carbon element such as silicon carbide (SiC), glassy carbon (g-C), diamond-like carbon (DLC), amorphous carbon (a-C), titanium carbide (TiC), tungsten carbide (WC), chromium carbide (CrC), vanadium carbide (VC), or niobium carbide (NbC). Further it is also possible to form the graphite film by CVD. Furthermore, the thin line grown in the present embodiment is but not limited to one constituted of CNF. Similar advantages are naturally obtained from CNT or GNF thin line which can be grown by controlling growth rate and/or atmosphere.

Figure 10:
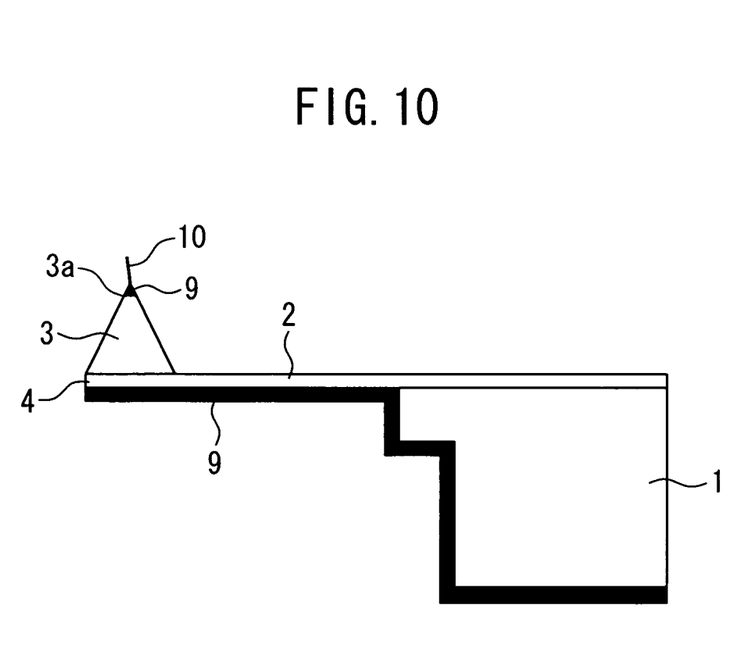
FIG. 10 is a side view showing partially in section construction of SPM cantilever according to a third embodiment of the invention.

A third embodiment of the invention will now be described. FIG. 10 is a side view showing partially in section the SPM cantilever according to the present embodiment. FIG. 10 includes: a support portion 1 fabricated by processing Pyrex glass (registered trademark); a lever portion 2 extended from the support portion 1; and a probe 3 disposed toward a free end 4 of the lever portion 2. Numeral 9 denotes a gold (Au) film formed only over the back side of the lever portion 2 and support portion 1 and at a probe terminal end portion 3a, and 10 denotes a piece of gold nanowire thin line grown/formed from the gold film 9 of the probe terminal end portion 3a. Here, unlike the first and second embodiments, the thin line 10 is a metal nanowire consisting of a metal.

Figure 11A:
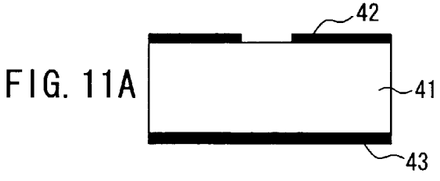
FIGS. 11A to 11I are manufacturing process drawings for explaining a manufacturing method of SPM cantilever according to the third embodiment shown in FIG. 10.

A manufacturing method of SPM cantilever having MNW thin line 10 at the probe terminal end portion according to the present embodiment will now be described by way of the manufacturing process drawings of FIG. 11A to FIG. 11I. First, a probe forming mask pattern 42 for example of a thermal-oxidation silicon film is formed by means of photo-lithography on a silicon substrate 41 having lattice plane (100) as shown in FIG. 11A. At this time, on the back side of the silicon substrate 41, a thermal-oxidation silicon film 43 is formed all over the back side.

Figure 11B:
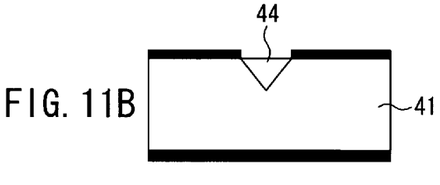

Next, as shown in FIG. 11B, the silicon substrate is dipped into an alkaline solution such as KOH to form a square pyramid 44 as a hole surrounded by (111) plane on a portion of the front side of the silicon substrate 41 on which the mask pattern 42 has been formed.

Figure 11C:
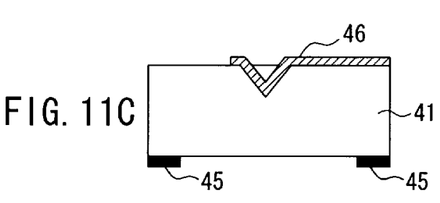

Next, as shown in FIG. 11C, a mask 45 for forming a hole at the probe terminal end portion is formed on the thermal-oxidation silicon film 43 which was previously formed on the back side of the silicon substrate 41. Subsequently, a silicon nitride film 46, which will become the lever portion, is formed all over the surface of the silicon substrate 41 by using for example reduced-pressure CVD. The silicon nitride film 46 on the front side is then patterned into the shape of the lever portion, and at the same time the silicon nitride film formed on the back side is removed.

Figure 11D:
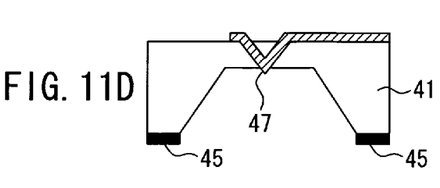

Next, as shown in FIG. 11D, the mask 45 for forming a hole at the probe terminal end portion formed on the back side of the silicon substrate 41 is used to process the silicon substrate 41 from the back side by means of an alkaline solution such as KOH until a silicon nitride film 47 for constituting the probe terminal end portion appears.

Figure 11E:
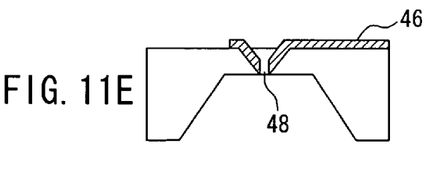

Next, as shown in FIG. 11E, only the silicon nitride film 47 constituting the probe terminal end portion is removed from the back side of the silicon substrate 41 with using RIE (Reactive-Ion-Etching) to form a hole 48 at the probe terminal end portion. Also, at this time, the mask 45 used for the opening on the back side is simultaneously removed.

Figure 11F:
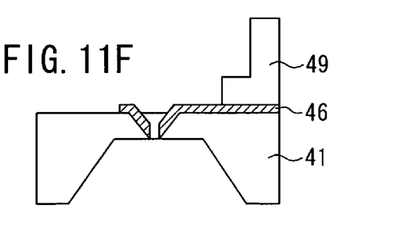

Next, as shown in FIG. 11F, Pyrex glass (registered trademark), which will become a support portion 49, is joined by means of anodic joining to the silicon nitride film 46 which constitutes the lever portion so as to join it to the silicon substrate 41 through the silicon nitride film.

Figure 11G:
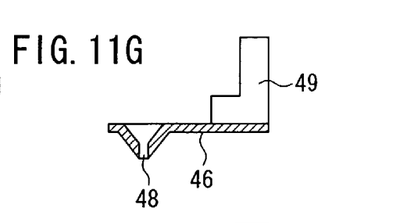

Next, as shown in FIG. 11G, the silicon substrate 41 is removed by dipping it into an alkaline solution such as KOH.

Figure 11H:
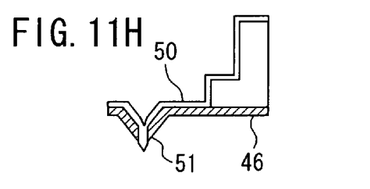

Next, as shown in FIG. 11H, a noble metal film such as a gold film 50 is formed to a thickness of the order of several nm to several μm by means of sputtering or electron beam vapor deposition on the back side of the silicon nitride film 46 which constitutes the lever portion. Equivalent effects are obtained in such a wide range of film thickness of the gold film 50. At this time, since the hole 48 is previously formed at the probe terminal end portion, the gold film 50 comes to appear at the probe terminal end portion 51 whereby a cantilever of the construction having the shape as shown in the figure is obtained.

Finally, similarly to the first and second embodiments, the cantilever having the above construction is set to the interior of a vacuum apparatus, and a piece of gold nanowire thin line 52 is grown/formed from the probe terminal end portion 51 by means of a high-energy beam irradiation. Specifically, a vacuum of the order of $10^{-2}$ Pa to $10^{-8}$ Pa and preferably of the order of $10^{-3}$ Pa to $10^{-5}$ Pa is set, and argon ion, which is a rare gas ion, is used as the source of ionization. An acceleration voltage of 0.1 to 300 keV and an average ionic current density of $2\,\mu A/cm^2$ to $10\,mA/cm^2$ are employed to achieve an ion beam sputter rate of the order of 2 nm to 1 μm/min so as to grow/form the gold nanowire thin line 52 having a length of the order of 0.1 to 10 μm and a thickness of the order of 1 to 10 nm from the probe terminal end portion consisting of a gold film by means of an ion irradiation of 1 to 100 minutes at room temperature. When the ion beam is irradiated onto the probe terminal end portion in this manner, chemical bond and transfer occur of the atoms at the probe terminal end portion, and as a result a thin line consisting of a piece of gold nanowire is selectively grown/formed at the probe terminal end portion.

Figure 11I:
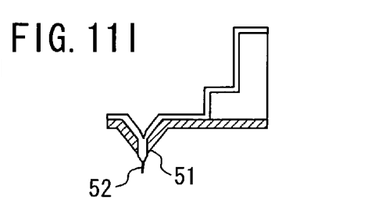

While the growing of the gold nanowire thin line has been shown as that effected at room temperature, it may also be grown while heating it from room temperature to about 500-600° C. Cooling from room temperature to −150° C. is also possible. When the temperature at the time of the ion beam irradiation is changed in this manner, the film quality and growth rate of the gold nanowire thin line can be controlled. Further, by changing the ionic current density and acceleration voltage of the ion beam, the sputter rate can be readily changed. Furthermore, while one using argon ion, which is a rare gas ion, as the source of ionization has been shown, helium ion, neon ion, or xenon ion may also be used, and it is also possible to use a reactive gas ion such as nitrogen ion, oxygen ion, or an ion containing CH radical. The above forming condition of the gold nanowire thin line has been shown by way of an example only and naturally it is not limited to such. By the manufacturing process of the above, SPM cantilever as shown in FIG. 11I is complete.

With such SPM cantilever, since the terminal end of MNW thin line of the probe terminal end portion may be always kept vertically to a horizontal surface of the sample when it is attached to SPM apparatus and also since a probe having high aspect ratio is achieved, an improved resolution at the time of SPM measurements is expected. Since it is a nanowire of a metal, it can be provided with electrical conductivity. Since a thin line consisting of one piece only can be formed in a well controlled manner at the probe terminal end portion through batch fabrication, a reduction in cost results. The gold film is formed only at the hole formed at the probe terminal end portion so that selectivity of the position for forming MNW thin line is improved. Since a silicon nitride film is used for the lever portion, a soft SPM cantilever having small spring constant is fabricated so that scanning is possible without damaging for example even a biological sample to be measured.

Furthermore, by coating the back side of the lever with a metal film, a sufficient quantity of reflected light can be readily obtained even of a lever portion made of silicon nitride or the like from which a sufficient quantity of reflected light cannot be obtained. Moreover, since MNW is grown/formed as having almost the same thickness all along, a probe having high aspect ratio can be achieved. As a result, well reproducible and stable high-resolution measurements are possible even of a sample having rough surface irregularities. Accordingly, a highly reliable SPM cantilever is achieved. The shape of cantilever probe includes but not limited to a pyramidal form as that has been shown in the present embodiment, and similar advantages are naturally obtained also from polygonal pyramidal probes or conical probes.

Further, while an example has been shown as having gold (Au) film formed all over the side opposite to the side on which the probe is formed as well as on the probe terminal end portion, it suffices that a gold film be formed at least on the probe terminal end portion. The metal film to be used includes but not limited to gold film, and it is possible to use a film of such metal as tungsten (W), titanium (Ti), molybdenum (Mo), copper (Cu), aluminum (Al), nickel (Ni), cobalt (Co), iron (Fe), chromium (Cr), gadolinium (Gd), or manganese (Mn), or such noble metal as gold (Au), platinum (Pt), silver (Ag), or palladium (Pd), or a compound of these. Naturally a metal nanowire (MNW) thin line or metal nanotube (MNT) thin line can be grown/formed by a high-energy beam irradiation onto a metal or metal compound film formed of these. SPM cantilever with a thin line having electrical conductivity or ferromagnetism can be achieved by these methods.

The metal film to be formed on the back side of the side on which the probe is formed includes but not limited to gold film, and a noble metal such as platinum (Pt), if capable of reflecting laser beam at the time of measuring a sample, may also be used. Further, while an ion beam has been used as the high-energy beam in growing/forming MNW, it is naturally also possible to use such high-energy beams as laser beam, electron beam or high density plasma besides the ion beam.

Effect of the Invention

As has been described by way of the above embodiments, it is possible according to the present invention to provide SPM cantilever capable of stable, high-resolution measurements with having high reliability and excellent durability. The manufacturing method of SPM cantilever according to the invention makes it possible to readily fabricate by batch fabrication a thin line made such as of carbon nanofiber (CNF), carbon nanotube (CNT), graphite nanofiber (GNF), semiconductor nanowire (SNW), semiconductor nanotube (SNT), metal nanowire (MNW), or metal nanotube (MNT) on a probe terminal end portion of SPM cantilever in a selective manner while controlling direction thereof. Such a thin line can be made to have a substantially uniform thickness and to have high aspect ratio so that, when it is attached to SPM, the apex of its probe be caused to act always vertically to a horizontal surface of the sample to be measured, making high-resolution measurements possible. Further it has an excellent durability, and a selective use of an optimal thin line is possible by suitably selecting material, thickness, structure, or electrical characteristics and magnetic characteristics according to its use. Accordingly, SPM cantilever having a reliable probe can be manufactured.

What is claimed is:

1. An SPM cantilever comprising:
   a support portion;
   a lever portion extended from the support portion; and
   a projection-like probe formed in the vicinity of a free end or on a terminal end of the free end of the lever portion;
   said SPM cantilever having a coating film made of carbon or semiconductor or metal or a chemical compound of these formed over at least the entire surface of said projection-like probe;
   wherein a terminal end portion of said probe is provided with a piece of thin line integrally formed with the coating film over the probe surface without an adhesive as continuously extended from the probe terminal end portion, and said thin line is directly grown and formed from said coating film itself and is made of the same material as said coating film.

2. The SPM cantilever according to claim 1, wherein said thin line comprises one selected from a carbon nanofiber (CNF) or carbon nanotube (CNT) or graphite nanofiber (GNF).

3. The SPM cantilever according to claim 1, wherein said thin line comprises a semiconductor nanowire (SNW) or semiconductor nanotube (SNT).

4. The SPM cantilever according to claim 1, wherein said thin line comprises a metal nanowire (MNW) or metal nanotube (MNT).

5. The SPM cantilever according to claim 1, wherein said projection-like probe has a tetrahedral shape.

6. The SPM cantilever according to claim 1, wherein said projection-like probe has a pyramidal shape.

7. The SPM cantilever according to claim 1, wherein said projection-like probe has a polygonal pyramidal shape.

8. The SPM cantilever according to claim 1, wherein the projection-like probe has a conical shape.

9. An SPM cantilever comprising:
   a support portion;
   a lever portion extended from the support portion; and
   a projection-like probe formed in the vicinity of a free end or on a terminal end of the free end of the lever portion;
   at least said probe being made of semiconductor;
   wherein a terminal end portion of said probe is provided with a piece of thin line integrally formed with the probe terminal end portion without an adhesive as continuously extended from the probe terminal end portion, and
   wherein said thin line is directly formed from said projection-like probe itself and is a semiconductor nanowire (SNW) or a semiconductor nanotube (SNT) made of the same material as said probe.

* * * * *